UNITED STATES PATENT OFFICE 2,374,657

RESINOUS MATERIAL AND PROCESS OF PREPARING

Joseph P. Bain, Jacksonville, Fla., assignor, by mesne assignments, to Nelio Resin Processing Corporation, Cleveland, Ohio, a corporation of Ohio No Drawing. Application October 10, 1941,
Serial No. 414,455

18 Claims. (Cl. 260—103)

The present invention relates to the production of synthetic resins and particularly to new resin bodies produced from rosin.

It has heretofore been proposed to form an alcohol by the condensation of formaldehyde with rosin or abietic acid. This alcohol may then be esterified, either subsequently to or during the course of the reaction between rosin and formaldehyde with volatile carboxylic acids such as acetic acid. The reactions are probably in accordance with Equations 1 and 2.

Equation 1

$$C_{19}H_{29}COOH + HCHO \rightarrow HO-CH_2-C_{19}H_{28}COOH$$

Equation 2

$$HO-CH_2-C_{19}H_{28}COOH + CH_3COOH \rightarrow$$
$$CH_3-CO_2-CH_2-C_{19}-H_{28}COOH + H_2O$$

It has now been found that the product produced by the above mentioned condensation and esterification reaction may be further treated to remove combined acetic acid to produce resins of higher melting point and lower acid, saponification and ester numbers.

The primary resin condensate may be formed by heating together rosin, formaldehyde (or operable equivalent as paraformaldehyde) and acetic acid at 100 to 125° for several hours at atmospheric pressure or for shorter lengths of time and higher temperatures under superatmospheric pressure. This condensation product may then be freed of uncombined acetic acid and water by heating to 250 to 290° C. under vacuum and has the following general properties:

| | |
|---|---|
| Ring and ball, M. P. ° C | 80–90 |
| Acid number | 105–140 |
| Saponification number | 170–250 |
| Ester number | 50–140 |

On continued heating at 270 to 305° acetic acid gradually distills and leaves a resin of quite different properties.

| | |
|---|---|
| Ring and ball, M. P. ° C | 95–135 |
| Acid number | 50–95 |
| Saponification number | 70–110 |
| Ester number | 15–50 |

The properties of the primary and secondary resins as indicated above may vary over a considerable range of values depending upon the relative quantities of rosin, formaldehyde and acetic acid used, the temperature and length of time employed in producing the final condensate, etc.

The second phase of the reaction probably involved the exchange of an abietate group for an acetate group and consequent loss of acetic acid according to the following equation:

Equation 3

$$N(CH_3CO_2-CH_2C_{19}H_{28}COOH) \rightarrow$$
$$(N-1)CH_3COOH + CH_3-CO_2-CH_2-$$
$$C_{19}H_{28}CO_2(-CH_2C_{19}H_{28}-CO_2)_{N-2}-$$
$$CH_2-C_{19}H_{28}COOH$$

where N is an integer greater than unity.

Reasons for the above explanation are:

(1) The final resin has a higher melting point but lower acid number than the unprocessed primary condensate indicating that free carboxyl groups have disappeared, but since the melting point is higher this result cannot be due to decarboxylation since such decarboxylation would result in lower melting resins or heavy oils.

(2) Acetic acid distills during the heating process for formation of the higher melting resin. This acetic acid was chemically combined in the primary condensate and could only have been combined as an ester of the primary alcohol resulting from the condensation of rosin and formaldehyde.

(3) The ester number (saponification number minus acid number) of the final product is much lower than that of the primary condensate. This can only be due to exchange of an easily saponifiable ester (acetate) for a difficultly saponifiable ester (the abietates are only slightly affected by the ordinary saponification method using 0.5 N alcoholic potassium hydroxide).

(4) The relatively low solubility of the final resin in paraffin hydrocarbon solvents and its high melting point indicate a high molecular weight. Such a high molecular weight can probably be obtained under the conditions indicated only by a condensation of the ester type as shown.

Esters of rosin or resin acids such as methyl abietate may also be reacted with formaldehyde and acetic acid to form primary condensates which further condense with loss of acetic acid and/or acetic esters to yield higher melting resins on prolonged heating at 250° to 350° C.

Variations in the properties of the final condensate may be obtained by variation of the relative quantities of reactants to produce the original condensate. The properties of the heat processed resin may also be varied by choice of the heat processing time and temperature. Other volatile carboxylic acids than acetic may be used in the formation of the primary condensate.

The following examples are to be taken as illustrative of the invention and not as limitative:

Example I 3 kilograms of "N" grade rosin, 500 grams of paraformaldehyde and 1500 cc. of glacial acetic were heated at gentle reflux for eleven and a half hours and uncombined acetic acid then removed by distillation. The distillation was carried out first at atmospheric pressure and finally at 25 inches vacuum. When the temperature of the resin had reached 275° C. and the acetic acid distillation had slowed down, a sample was taken. Samples were taken at hour intervals while holding the temperature at 275–297° C.

| Sample | M. P. C. ball and ring | Acid number | Saponification number |
|---|---|---|---|
| 1 | 86 | 110.5 | 227 |
| 2 | 97 | 93.5 | 178 |
| 3 | 104 | 85.0 | 152 |
| 4 | 109 | 79.0 | 130 |
| 5 | 115 | 72.0 | 121 |
| 6 | 120.5 | 66.0 | 110 |
| 7 | 123.5 | 61.0 | 97 |
| 8 | 127.0 | 58.5 | 87 |

The grade of the final resin was "I."

Example II

A mixture of 3 kg. "N" rosin, 600 g. paraformaldehyde and 1.5 liters of glacial acetic acid was heated at 110–115° C. for about twelve hours and then the excess acetic acid and the water formed in the esterification of the condensate were distilled by slowly heating the mixture to 245° C. under a 25 in. vacuum. A sample of the resin was caught and analyzed, M. P. 85, acid number 117, saponification number 256. Heating was continued at 280 to 297° C. under a 25 in. vacuum. A total of 452 cc. of distillate was obtained during the next nine hours of heating. The resin was then cooled and analyzed M. P. 136° C., acid number 50.4, saponification number 63.6.

Example III

After heating a mixture of 3 kg. "N" rosin, 1500 cc. glacial acetic acid and 250 g. paraformaldehyde for 10 hours at 105–120° C. the mixture was stripped of water and excess acetic acid under vacuum up to a temperature of 275° C. At this point, the resin had M. P. 88° C., acid number 114.2, saponification number 171.5. This resin was maintained at a temperature of 275 to 292° for five hours during which acetic acid was allowed to distill. The resin then had M. P. 101° C., acid number 87.1, saponification number 105.

Example IV

A mixture of one mole methyl abietate, two moles formaldehyde, and five moles acetic acid was heated at 112 to 116° for five hours and distilled. The viscous pale yellow liquid acetate of the condensation product of formaldehyde and methyl abietate was collected as a fraction of boiling range 220 to 285° C. at 3–5 mm. pressure. The saponification number of this product was 192.7. On heating 136 g. of this ester with 1 g. of 4% limed rosin to 280–295° C. for six hours a small amount of low boiling material distilled. The residue became much more viscous and showed a saponification value of 132.4. Further heating at 300–340° C. for six hours produced a resin of M. P. 53° C., saponification number 65.6.

Example V

A mixture of 3 kg. of rosin, 400 g. paraformaldehyde and 1.5 liters of butyric acid was heated at 115 to 135° C. for twelve hours. The excess butyric acid and water were removed by heating the resin slowly to 290° C. under a vacuum of 25 inches. The resin then had M. P. 105° C., acid No. 74.0, saponification number 125.2. After heating at 290–295° C. for seven hours the resin melted at 113° C. and had saponification number 64, acid number 63.

Example VI

A mixture of 400 g. paraformaldehyde, one and a half liters of acetic acid and three kg. of rosin (N) was heated at 110–115° C. for eight hours and then water and excess acetic acid were distilled by raising the temperature of the resin to 285° C. and holding it at this temperature for eight hours under a 25 inch vacuum. The resin was allowed to cool to about 250° C. and 150 g. of glycerine added. After holding the resin at 250° C. for three hours and 285–295° C. for two hours the resin was cooled and sampled. Ring and ball M. P. 118° C.; acid number 22.7.

The resin may be further modified during the final condensation process by the use of various esters, acids, or alcohols such as ester gum, phthalic acid, glycerine, phenol-formaldehyde condensates, etc., which may react by ester exchange or direct esterification. In some cases it may be desirable to add small quantities of exchange catalysts such as metal salts of organic acids (or their equivalent such as metal oxides) aromatic sulfonic acids or mineral acids.

It will also be understood that in place of rosin, the equivalents thereof such as abietic and other resin acids and their esters which form alcohol addition products with formaldehyde may be used. Equivalent materials are those resinous materials which like abietic acid possess an activated hydrogen atom capable of adding to a formaldehyde molecule and possessing a functional group such as carboxyl or ester group capable of further reaction.

In general the invention may be broadly summarized by the following equations:

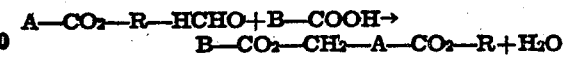

and

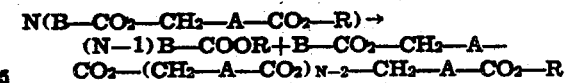

in which A represents the nucleus of a resin acid capable of forming an alcohol condensation product with formaldehyde, R is hydrogen or a group which may react by ester exchange to form a volatile compound B—COOR, B represents hydrogen or a hydrogen group selected from the class which forms volatile carboxylic acids and esters, and N is an integer greater than unity.

It will, of course, be obvious that where carboxyl groups are present esters and salts may be formed therefrom if desired.

Having described the invention what is claimed is:

1. The resinous product produced by heating the ester of a volatile carboxylic acid and an alcohol resulting from the addition of formaldehyde to an isomeric pine rosin acids having the empirical formula $C_{20}H_{30}O_2$ at a temperature sufficient to remove combined volatile carboxylic acid.

2. The resinous product resulting from heating an acetic acid ester of the alcohol produced by the reaction between rosin and formaldehyde to a sufficient temperature to distill off combined acetic acid.

3. The resinous product resulting from heating an acetic acid ester of the alcohol produced by the reaction between rosin and formaldehyde at a temperature of between about 250° C. and 350° C. until a substantial quantity of the combined acetic acid is distilled off.

4. The process of producing a resinous material which comprises heating an acetic acid ester of an alcohol formed by the addition of a formaldehyde molecule to an abietic acid molecule to a sufficient temperature to distill off combined acetic acid.

5. The process of producing a resinous material which comprises heating an acetic acid ester of the alcohol produced by the reaction between rosin and formaldehyde at a temperature of between about 250° C. and 350° C. until a substantial quantity of the combined acetic acid is distilled off.

6. The process which comprises directly effecting condensation of formaldehyde and an abietic acid molecule and esterifying the alcohol so formed with a volatile carboxylic acid and then heating the ester to a temperature sufficient to distill off combined volatile carboxylic acid.

7. The process which comprises directly effecting condensation of formaldehyde and an abietic acid molecule and esterifying the alcohol so formed with acetic acid, and then heating the acetic acid ester at a temperature of between about 250° C. and 350° C. until a substantial quantity of the combined acetic acid is distilled off.

8. The process which comprises directly effecting condensation of formaldehyde and abietic acid in the presence of a volatile carboxylic acid and heating the ester so formed to a temperature sufficient to distill off combined volatile carboxylic acid.

9. The process which comprises directly effecting condensation of formaldehyde and abietic acid in the presence of acetic acid and heating the acetate so formed to a sufficient temperature to distill off combined acetic acid.

10. The process of producing a resinous material which comprises heating the ester of a volatile carboxylic acid and an alcohol formed by the addition of a formaldehyde molecule to a compound selected from the class consisting of isomeric pine rosin acids of empirical formula $C_{20}H_{30}O_2$ and esters of said acids at temperatures sufficient to remove combined volatile carboxylic acid.

11. A resinous product substantially identical with that resulting from heating a volatile carboxylic acid ester of the alcohol produced by the reaction between rosin and formaldehyde to a temperature sufficient to distill off combined volatile carboxylic acid, said product having approximately the following characteristics:

M. P. °C. (ring and ball) _____ 95–136
Acid number _____ 50–95
Saponification number _____ 64–110

12. A resinous product produced by heating an ester of a volatile carboxylic acid and an alcohol resulting from the addition of a formaldehyde molecule to isomeric pine resin acids of empirical formula $C_{20}H_{30}O_2$ with a substance containing an acid radical of isomeric pine resin acids at temperatures sufficient to decrease the content of combined volatile carboxylic acid.

13. The process of producing resinous material which comprises heating the ester of a volatile carboxylic acid and an alcohol formed by addition of a molecule of formaldehyde to isomeric pine rosin acids of empirical formula $C_{20}H_{30}O_2$ to a temperature sufficient to distill off combined volatile carboxylic acid.

14. The process of producing a resinous material which comprises heating an ester of a volatile carboxylic acid and an alcohol formed by the addition of a molecule of formaldehyde to isomeric pine resin acids of empirical formula $C_{20}H_{30}O_2$ with a substance containing an acid radical of isomeric pine resin acids at a temperature sufficient to decrease the content of combined volatile carboxylic acid.

15. The process which comprises directly effecting condensation of formaldehyde with isomeric pine resin acids, esterifying the alcohol thus formed with a volatile carboxylic acid, and heating the thus formed ester at a temperature sufficient to distill off combined volatile carboxylic acid.

16. The process of claim 15 in which the volatile carboxylic acid is acetic acid.

17. Resinous substances selected from the class consisting of (1) substances having the formula $$BCO_2CH_2ACO_2(CH_2ACO_2)_{N-2}CH_2ACOOH$$

in which A represents the nucleus of isomeric pine resin acids, B is selected from the class consisting of hydrogen and hydrocarbon groups capable of forming volatile acids and esters of the formula B—COOR, in which R is hydrogen or a hydrocarbon group such that B—COOR is volatile, N is an integer greater than one, (2) esters of (1) and (3) salts of (1).

18. The process of producing a resinous material which comprises heating a compound of the formula

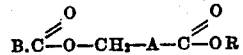

in which A represents the nucleus of isomeric pine rosin acids of empirical formula $C_{20}H_{30}O_2$, B and R are selected from the group consisting of hydrogen and a hydrocarbon group capable of splitting off from the remainder of the molecule and reacting to form a volatile compound B—COOR to a temperature sufficient to form and distill off said volatile compound B—COOR, leaving the resinous material as the residue.

JOSEPH P. BAIN.